(12) United States Patent
Lloyd

(10) Patent No.: US 8,276,846 B2
(45) Date of Patent: Oct. 2, 2012

(54) AIRCRAFT COMPONENT

(75) Inventor: James Lloyd, Bristol (GB)

(73) Assignee: Airbus Operations Limited, Bristol (GB)

( * ) Notice: Subject to any disclaimer, the term of this patent is extended or adjusted under 35 U.S.C. 154(b) by 324 days.

(21) Appl. No.: 11/762,342

(22) Filed: Jun. 13, 2007

(65) Prior Publication Data

US 2008/0087768 A1    Apr. 17, 2008

(30) Foreign Application Priority Data

Jun. 14, 2006  (GB) .................................. 0611804.6

(51) Int. Cl.
*B64C 1/00* (2006.01)
(52) U.S. Cl. ..................................... 244/121; 244/171.7
(58) Field of Classification Search .................. 244/121, 244/119, 133, 130, 132, 171.1; 89/36.014; 264/257, 258; 52/2.19, 66
See application file for complete search history.

(56) References Cited

U.S. PATENT DOCUMENTS

| | | | | |
|---|---|---|---|---|
| 2,961,053 A * | 11/1960 | Prewitt et al. | ................. | 416/226 |
| 4,667,906 A | 5/1987 | Suarez | | |
| 4,895,491 A | 1/1990 | Cross | | |
| RE34,173 E * | 2/1993 | Kerber | ........................ | 428/610 |
| 6,341,747 B1 * | 1/2002 | Schmidt et al. | ............ | 244/123.1 |
| 6,460,310 B1 * | 10/2002 | Ford et al. | ........................ | 52/837 |
| 6,479,124 B1 | 11/2002 | Porte | | |
| 6,513,757 B1 * | 2/2003 | Amaoka et al. | ............ | 244/123.7 |
| 6,544,366 B2 | 4/2003 | Hamilton et al. | | |
| 6,709,737 B2 * | 3/2004 | Rigali et al. | ................ | 428/304.4 |
| 7,205,066 B1 * | 4/2007 | Hammi et al. | ................ | 429/119 |
| 7,237,751 B2 * | 7/2007 | Anning | ........................ | 244/123.3 |
| 7,329,101 B2 * | 2/2008 | Carper et al. | ............. | 416/219 R |
| 7,393,488 B2 * | 7/2008 | Grose et al. | .................... | 264/254 |
| 7,517,580 B2 * | 4/2009 | Mulligan et al. | ............... | 264/250 |
| 2004/0000613 A1 | 1/2004 | Thomas | | |

FOREIGN PATENT DOCUMENTS

| | | |
|---|---|---|
| EP | 0496550 A1 | 7/1992 |
| GB | 0602628 A | 5/1948 |
| WO | 2004098993 A | 11/2004 |

* cited by examiner

*Primary Examiner* — Timothy D Collins
*Assistant Examiner* — Brian M O'Hara
(74) *Attorney, Agent, or Firm* — Lowe, Hauptman, Ham & Berner LLP

(57) ABSTRACT

An aircraft component includes a composite laminate structure, the composite laminate structure including an end surface at which a multiplicity of the layers of the laminate structure terminate. The aircraft component further includes a deflecting surface mounted to the composite laminate structure for protecting the end surface from direct impacts. In one embodiment, the end surface of the composite laminate structure has a convex cross-section and the deflecting surface includes laminate material laid over the end surface. In a further embodiment, the deflecting surface includes an inert strip.

18 Claims, 4 Drawing Sheets

AIRCRAFT COMPONENT

RELATED APPLICATIONS

The present application is based on, and claims priority from, British Application Number 0611804.6, filed Jun. 14, 2006, the disclosure of which is hereby incorporated by reference herein in its entirety.

BACKGROUND OF THE INVENTION

This invention relates to improving the tolerance of composite laminate structures to damage and/or delamination, resulting in weakening of the structure and/or to reducing the possibility of such damage and/or delamination. In particular, but not exclusively, the invention relates to protecting an end surface of a composite laminate structure of an aircraft component from impact damage.

Many aircraft components are made from composite laminate materials. For example, a stringer in an aircraft wing, stiffeners and spar structures, may all be in the form of composite laminate structures. While the structures may be strong when loaded in the way in which they have been designed to be loaded, they may be vulnerable to impact damage, which may result in delamination occurring. Delamination may result in the structure weakening and eventually failing. Particularly vulnerable are the planar end faces of composite laminate structures where an impact occurs, particularly if the impact is end-on (i.e. when the impact is in a direction perpendicular to the end face and parallel to the plane of the laminates that make up the structure). It will be understood that the planar end face is the surface at which the layers of the composite laminate structure terminate and that the normal axis of the end face is typically parallel to the direction in which the composite laminate structure extends from the end face. If an impact has a significant component of force in the end-on direction the impact may be capable of damaging the bonding between the laminate's layers comprising the composite laminate structure and causing, or adding to the effect of, delamination. Such impacts may be as a result of workmen dropping tools whilst working on the structure of an aircraft, during maintenance for example when the end surfaces of the composite laminate structures are exposed in a way they are usually not. A further way in which the composite laminate structures may be damaged is as a result of wear over time, such wear for example resulting from workmen sitting, or standing, on the structure or contacting the structure directly or by means of tools, or other equipment. It is for example common for a workman to rest tools or toolboxes on the end surface of such structures while working on the aircraft. The planar end face of a composite laminate structure is typically exposed, at least during maintenance, to direct wear and direct impacts as described above.

When designing an aircraft, factors that affect the strength and other mechanical properties of composite laminate structures of the aircraft, such as those factors described above, are taken into account. Thus, factors such as those described above typically mean that the composite laminate structures need to be provided with extra strength, resulting in an increase in size and weight, both of which are undesirable in aircraft design.

SUMMARY OF THE INVENTION

The present invention seeks to mitigate at least some of the above-mentioned problems concerned with composite laminate structures.

The invention provides an aircraft component comprising a composite laminate structure, the composite laminate structure including an end surface at which a multiplicity of the layers of the laminate structure terminate, wherein the aircraft component further comprises a deflecting surface mounted to protect the end surface of the composite laminate structure from direct impacts.

Advantageously, the deflecting surface is so shaped and arranged that in the event of an impact (in particular impacts in an end-on direction or impacts in a direction in which a significant component of the impact force is in an end-on direction) it acts to deflect the impact. Thus the deflection of the impact may reduce the impact force experienced and/or the damage sustained by the end surface of the composite laminate structure, thus making delamination of the composite laminate structure less likely. The deflection surface also acts as a shield or barrier, further protecting the composite laminate structure from direct impacts. The improved impact resistance of the end surface means that the composite laminate structure may be built smaller and lighter than if there were no end surface protection.

U.S. Pat. No. 6,544,366 (Hamilton et al.) discloses a prior art composite member including a flat end surface. U.S. Pat. No. 6,544,366 is primarily concerned with improving the mechanical properties of the composite member by reinforcing the member in the z-axis direction (i.e. through-the-layer strength). In particular, U.S. Pat. No. 6,544,366 proposes that laminate material be wrapped around the end surfaces of the laminate structure in order to reinforce the member where interlaminar tensile stresses are greatest. U.S. Pat. No. 6,544,366 also suggests the application of (optional) end surface protectors to the end surfaces of the composite member, such end protectors also providing extra z-axis reinforcement. The end surface protectors provide only limited protection to the composite member insofar as reducing the force of an impact is concerned, such protection arising from the formation of a barrier layer over the end surface. In particular, end-on impacts, as described earlier are not deflected by such end protectors, and the force experienced by the composite member is not reduced in the manner able to be provided by means of embodiments of the present invention.

It will of course be appreciated that the deflecting surface of the present invention may comprise a region so shaped and arranged that it is still possible for impacts to occur where the direction of impact is normal to the deflecting surface, normal to the end surface and parallel to the planes of the layers of the laminate structure. The deflecting surface does however have a smaller area that is exposed to impacts in that direction (such impacts, if there were no deflecting surface, being such that they would hit the end surface) than the area that would be exposed if the end surface were completely exposed to such impacts (i.e. not shielded by a deflecting surface or other shielding member) and planar and perpendicular to the layers of the laminate structure.

The composite laminate structure is a three dimensional object. It has a thickness, the thickness determined by the thickness and number of layers of the composite laminate structure. The composite laminate structure preferably includes a portion having thickness greater than 5 mm, and preferably greater than 7.5 mm. The composite laminate structure also has a width and length, both being parallel to the laminate layers of the structure, which may be substantially planar or may be curved. The end surface extends in a direction parallel to the layers of the composite laminate structure. The term cross-section is used herein in relation to the invention, unless the context suggests otherwise, to mean the cross-section taken along a plane having a normal parallel to the direction in which the end surface extends in the region of the cross-section. The plane of the cross-section is thus transverse to the plane of the layers of the laminate structure.

Preferably, at least one of the end surface and the deflecting surface has a shape such that in cross-section there is a portion that extends across the thickness of the laminate structure and that is inclined to a plane having its normal parallel to the direction in which the layers extend to the end surface. The portion may be flat or may be curved.

If one considers that the height of the component is measured in the direction in which the layers extend to the end surface, then at least one part of the cross-section of at least one of the end surface and the deflecting surface may have a greater height than another part of the cross-section. The deflecting surface may have a height when viewed in cross-section that varies across the majority of, and preferably substantially all of, the thickness of the composite laminate structure. It is preferable that at least 90% of the cross-section of the deflecting surface is at an angle other than perpendicular to the direction in which the layers extend. The end surface and/or the deflecting surface of the composite laminate structure may have cross-section with a peak, the peak for example extending along the length of the composite laminate structure. The end surface and/or the deflecting surface may for example have a cross-section including a central peak and inclined sides. The cross-section may be convex in shape, for example presenting a convex profile.

The end surface may be substantially straight in cross-section. The end surface may for example be shaped such that in cross-section the end surface is perpendicular to the direction in which the layers of the composite laminate structure extend. The cross-section of the deflecting surface may have a cross-section that has a profile that is significantly different from the profile defined by the end surface when viewed in cross-section. For example, the deflecting surface may be inclined to the end surface or the deflecting surface may be convex in cross-section compared to a flat end surface.

The cross-section of the deflecting surface may have the same shaped cross-section as the end surface it is protecting.

The deflecting surface may be defined by a composite laminate material. The composite laminate material may be bonded, for example adhesively bonded, to the end surface of the composite laminate structure. There may be a plurality of layers of composite laminate material bonded to the end surface, the uppermost of which defining the deflecting surface.

The deflecting surface may be defined by an inert strip. The inert strip may be sufficiently inert that it may be used in an aircraft fuel tank, because for example, it will not react with, or be degraded by, aviation fuel. Preferably, the inert strip is mechanically attached to the composite laminate structure. The term mechanically attached is used herein, unless the context suggests otherwise, to mean that the main force preventing one item from being detached from another is in the form of a physical engagement between those two items. It can be difficult to adhesively bond some inert materials to other materials therefore it is advantageous to be able to mechanically attach the inert strip to the composite structure.

The inert strip may be mechanically attached to the composite structure by formations present on the composite laminate structure for engaging with corresponding formations present on the inert strip. The formations present on the composite laminate structure may be defined by material, for example adhesive, resin or the like, adhesively bonded to the composite laminate structure. The formations of the inert strip may be defined by recesses in which the formations of the composite laminate structure are accommodated. The formations of the composite laminate structure may be in the form of protrusions.

The inert strip may be a PolyTetraFluoroEthylene (PTFE) strip. PTFE is fuel resistant and therefore may be used in a fuel tank. Other noble plastics may be used to make the inert strip, such as perfluoroalkoxy fluorocarbon (PFA) or fluoroethleyene propylene (FEP).

Preferably, the inert strip is removably mounted to the aircraft component. In the case where the inert strip and the composite structure include corresponding formations, the geometry of the inert strip including its formations is preferably such that the inert strip is removable and replaceable with a similar strip without having to create new formations on the composite structure. Therefore, should the inert strip experience an impact and be damaged, it is easily replaceable. The inert strip may be a deformable strip. The inert strip may include at least one hollow section. The provision of a hollow section may allow the strip to deform readily on impact. Furthermore, the weight of the inert strip may be reduced in this way. The hollow section may have an approximately circular cross-section. The hollow section may be in the form of a recess in the inert strip, such as a large groove running along the length of the inert strip. The outer surface of the inert strip may be the same shape as the cross-section of the hollow section of the strip.

An aircraft component comprising a composite laminate structure and a deformable strip mounted to protect the end surface of the composite laminate structure from direct impacts is described in UK patent application entitled "Improved Composite Aircraft Component", with agent's reference 12035 GB, having the same filing date as the present application. The contents of that application are fully incorporated herein by reference. The aircraft component of the present invention may incorporate any of the features disclosed in that patent application. In particular, the claims of the present application may be amended, insofar as the inert strip is concerned, to include one or more features described in relation to the deformable strip of the aircraft component as described or claimed in the above-mentioned related patent application (whilst not necessarily requiring that the inert strip of the present invention is deformable). For example, the inert strip of the present invention may have a shape in accordance with the shape of the "deformable strip" according to any aspect of the aircraft component as described or claimed in that patent application. The inert strip may for example have one or more hollow sections.

The invention also provides a method of manufacturing an aircraft component as described herein. The method may comprise the steps of providing a composite laminate structure including an end surface at which a multiplicity of the layers of the laminate structure terminate, and mounting a deflecting surface to the composite laminate structure for protecting the end surface from direct impacts.

The invention further provides a method of manufacturing an aircraft component comprising the steps of:

providing a composite laminate structure including an end surface at which a multiplicity of the layers of the structure terminate, machining the said end surface such that it presents a convex cross section, laying a composite laminate material over the convex end surface, and curing the composite laminate material such that it adhesively bonds to the composite laminate structure.

The aircraft component so manufactured thus has a convex end surface protected by means of a further layer of composite laminate material. The composite laminate material protecting the convex end surface, being convex itself, may act as a deflecting surface, deflecting end-on impacts to reduce the force of the impact sustained by the composite laminate structure.

The composite laminate material may be in the form of a pre-preg patch placed over the end surface and cured such that it bonds to the end surface. It will be appreciated that a pre-preg patch is typically a patch of mat, fabric, non-woven material or roving previously impregnated with resin. Alternatively, the step of laying of the composite laminate material over the convex end surface may be achieved by means of laying a dry patch of mat, fabric, non-woven material or roving over the convex end surface. Resin may then be added separately, for example by means of laying flexible sheets of resin over the convex end surface or by means of infusing resin during the curing step.

The method may include laying a plurality of layers of composite laminate material over the end surface.

The fibre material of the or each layer of composite laminate material laid over the end surface may be in the form of a unidirectional patch. The fibre material of the or each layer of composite laminate material laid over the end surface may be in the form of a woven patch. The lay up may be balanced and symmetric. An embodiment described below utilises a +45 degree/−45 degree lay up, although any suitable lay up orientation may be used. The fibre composition of the composite laminate material laid over the edge may be the same as that of the composite laminate structure. The composite laminate material may be in the form of carbon fibre reinforced plastic (CFRP), glass reinforced plastic (GFRP) or Aramid Reinforced plastic (AFRP).

The invention also provides a method manufacturing an aircraft component comprising a composite laminate structure, the method including the steps of:
providing a composite laminate structure including an end surface at which a multiplicity of the layers of the laminate structure terminate,
providing an inert strip including formations,
adding adhesive material in the region of the formations of the inert strip,
applying the inert strip to the said end surface,
curing the adhesive material, such that once cured, the inert strip is mechanically attached to the composite laminate structure.

The step of adding the adhesive material in the region of the formations of the inert strip may be performed before or after the step of applying the inert strip to the end surface of the composite laminate structure.

The formations of the inert strip may define recesses and the step of adding adhesive material may comprise partially or completely filling the recesses.

The invention further provides an aircraft component comprising a composite laminate structure, an inert strip, and material adhesively bonded to the composite laminate structure in a way that mechanically attaches the inert strip to an end surface of the composite laminate structure. In order to mechanically attach the inert strip to the composite structure the inert strip may include formations, for example in the form of recesses, within which the adhesively bonded material is accommodated, the geometry of the formations being such that once the strip is held in place by means of the mechanical engagement between the inert strip and the material within the formations.

The invention also provides an aircraft including an aircraft component according to any aspect of the invention described herein. The invention further provides an aircraft wing including an aircraft component according to any aspect of the invention described herein.

It will of course be appreciated that features of aspects of the invention relating to the aircraft component of the invention may be incorporated into a method of manufacture according to the present invention and vice versa. Thus, the aircraft component of the present invention may possess features that would result from the performance of a method according to any aspect of the invention. Also, a method according to the present invention may be performed in such a way as to result in the manufacture of a component possessing features of an aircraft component according to any aspect of the invention.

BRIEF DESCRIPTION OF THE DRAWINGS

Embodiments of the invention will now be described, by way of example only, with reference to the accompanying drawings of which.

DETAILED DESCRIPTION OF THE DRAWINGS

Figure 1:
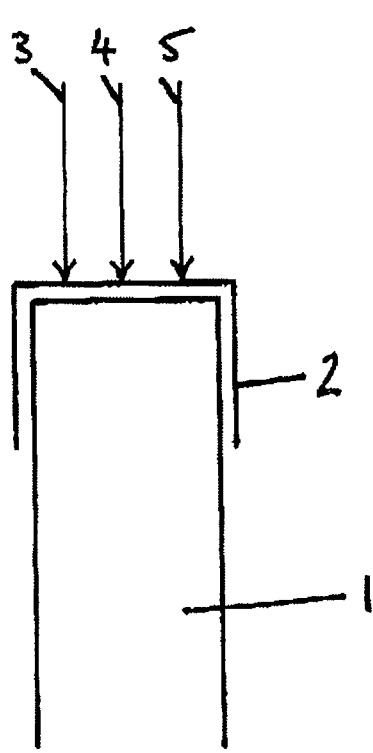
FIG. 1 is a cross-sectional view of the prior art with the effect of the end surface reinforcement on end-on impacts indicated.
Figure 2:
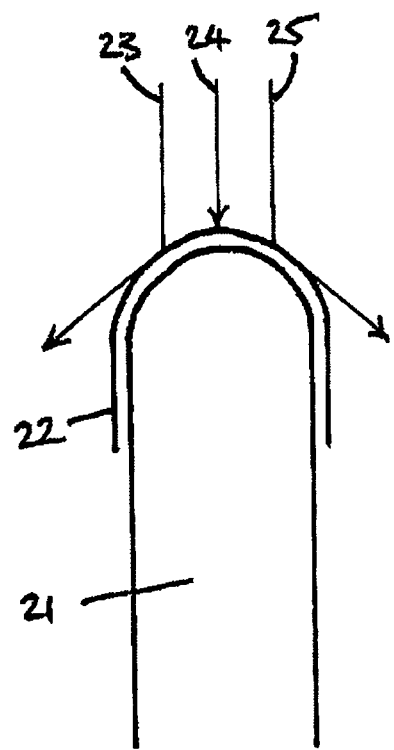
FIG. 2 is a cross-sectional view of a first embodiment of the invention with the effect of the deflecting surface on end-on impacts indicated.

FIG. 1 shows a range of end-on impacts 3, 4, 5, spread over the end surface of a composite member 1 having an end surface protector 2 in accordance with U.S. Pat. No. 6,544, 366. The end surface protector 2 receives the impacts, but does nothing to deflect the force of the impacts from the end surface of the composite member. FIG. 2 shows the contrasting results obtained by an embodiment of the invention, which includes a deflecting surface. The same range of end-on impacts 23, 24, 25, are shown spread across the end surface of the composite laminate structure 21. As can clearly be seen, impacts 23 and 25 are deflected by the deflecting surface 22, resulting in the end surface of the composite laminate structure 21 experiencing less of the force of the impact.

Figure 3:
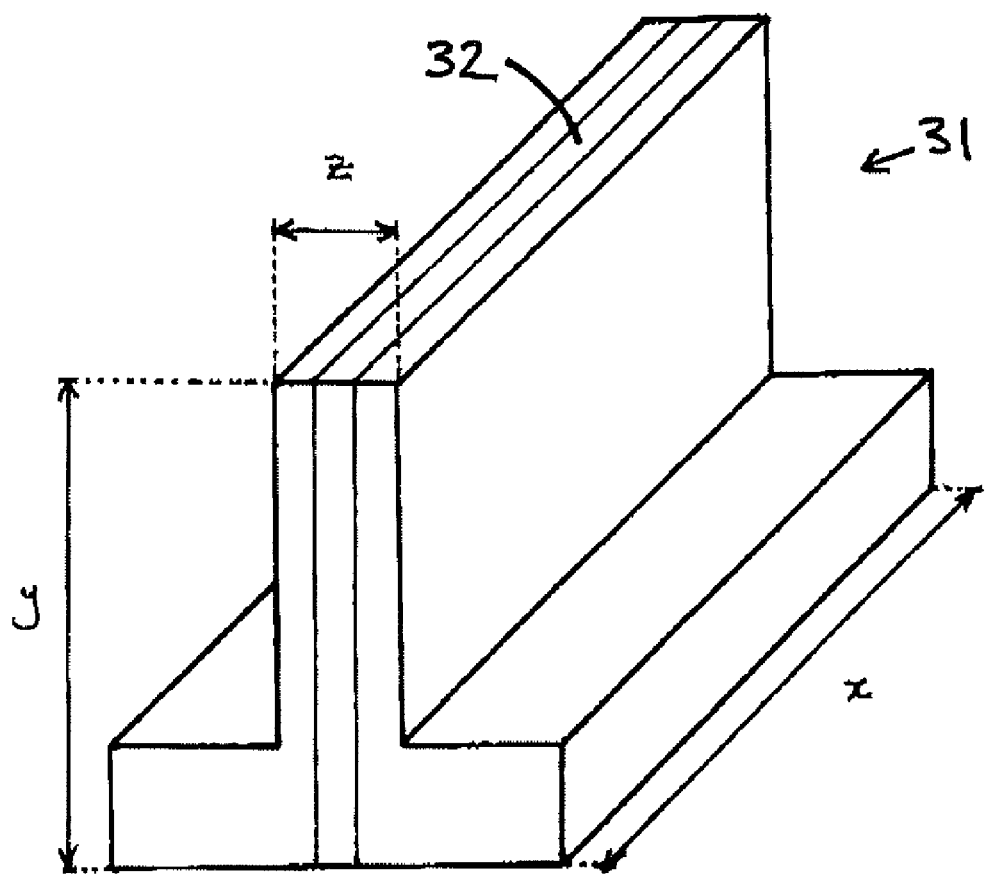
FIG. 3 is a three dimensional view of an aircraft stringer.

FIG. 3 shows a schematic representation of an aircraft stringer 31 with various dimensions indicated. The length of the stringer is represented by the letter x, the height of the stringer is represented by the letter y and the thickness of the stringer is represented by the letter z. The stringer is made up of a number of plies of laminate materials that have been laid on top of each other and then cured in an autoclave and it can be seen from the diagram the plane in which the laminate materials have been laid, i.e. perpendicular to the thickness z and parallel to the length x and height y (i.e. the length of the plies runs parallel to the length x, and the width of the plies runs parallel to the height y). The stringer includes an exposed end surface 32. The direction in which the length x of the stringer 31 is measured as 0 degrees and the direction in which the height y of the stringer is measured as 90 degrees. The lay-up of the stringer is represented by a notation representing the percentage of the fibres in the lay up that are oriented in the directions 0 degrees/±45 degrees/90 degrees. A typical stringer lay-up is 60/30/10. Therefore, 60 percent of the fibres are oriented in the 0 degree direction, 30 percent in the ±45 degree direction and 10 percent in the 90 degree direction. The lay-up of stringer utilised in this embodiment is 70/20/10.

It is necessary in aircraft manufacture to design stringers to a certain design allowable strain. A typical allowable strain of a composite laminate stringer would, when not accounting for impact damage, be about 3.7 kμE. However, the exposed end surface 32 is vulnerable to impact, especially impacts in a direction parallel to the height of the stringer. This can bring the allowable strain down to approximately 3 kμE. Aluminium then becomes a better choice with regard to the ratio of weight to allowable strain.

Figure 4:
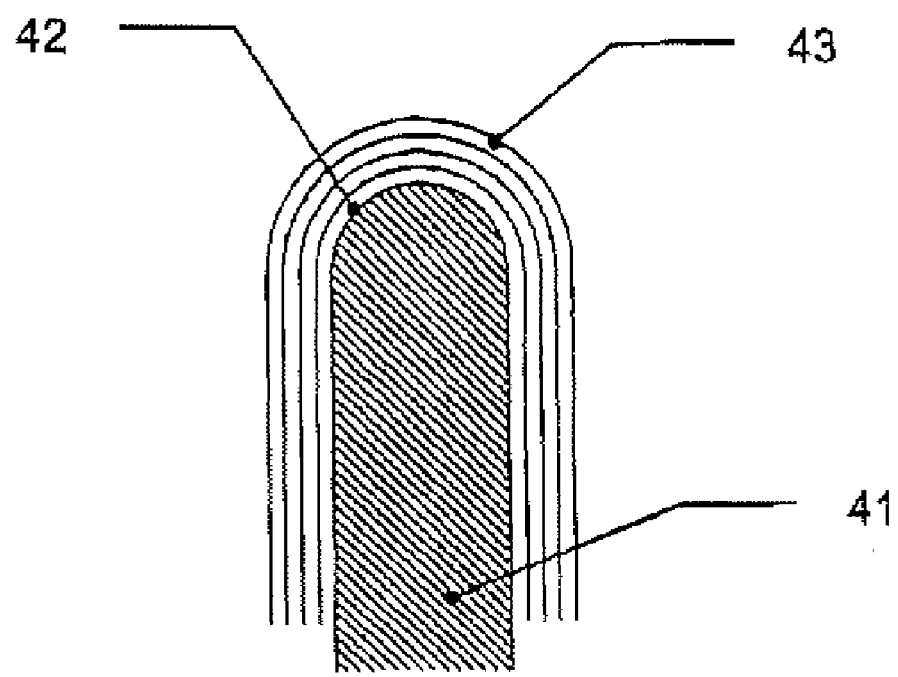
FIG. 4 is a cross-sectional view of the first embodiment of the invention.

FIG. 4 shows a first embodiment of the invention, in which the composite laminate structure is an aircraft stringer 41, of the same basic construction as described relating to FIG. 3, but with only the top section of the stringer shown in cross-section. The end surface 42 of the composite laminate structure 41 has been machined by a router into a convex shape, such that it presents an approximately semi-circular profile in cross section. The stringer 41 has a thickness of 10 mm and is made up of 54 plies, each ply 0.183 mm thick. The height of the stringer 41 varies across the end surface due to the semi-circular shape, and is 65 mm at the lowest point, and 70 mm at the highest, and the length is 1000 mm. Four unidirectional pre-preg patches 43, each 0.183 mm thick, are laid over the end surface 42 of the stringer 1 in a balanced and symmetric manner, the pre-preg patches covering all of the end surface and also extending some way down the sides of the stringer 41. Taking the direction in which the thickness z of the stringer is measured as 0 degrees, two of the pre-preg patches are laid with their fibres in the plus 45 degrees direction, the other two pre-preg patches laid with their fibres in the minus 45 degree direction. Thus it can be seen that half of the fibres of the pre-preg patches are perpendicular to the other half of fibres of the pre-preg patches. The stringer 41 including the uncured pre-preg patches 43 is then placed in an autoclave and undergoes a cure cycle until the pre-preg patches 43 are cured. The curing process adhesively bonds the pre-preg patches 43 to the stringer 41 and also hardens them. As a result the pre-preg patches 43 define a deflecting surface that protects the end surface 42 from direct impacts and the resultant delamination of the composite laminate structure 41. The pre-preg patches also act to reinforce the stringer in the direction of its thickness z. The design allowable strain of the stringer 41 is greater than 3 kμE and thus the composite stringer can be significantly lighter than an unprotected stringer.

Figure 5:
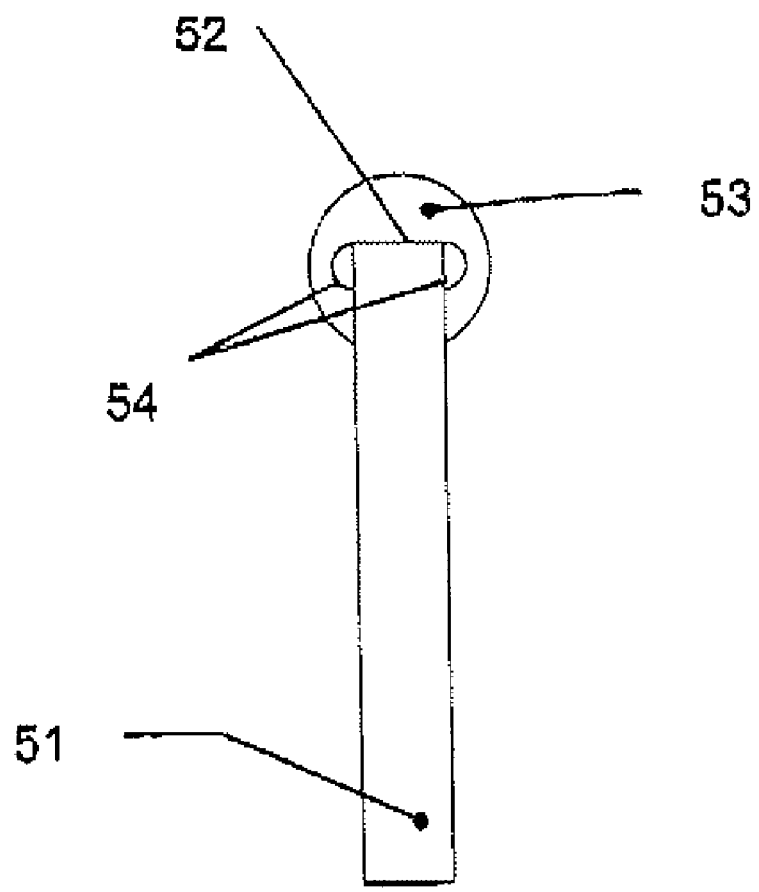
FIG. 5 is a cross-sectional view of a second embodiment of the invention.

FIG. 5 shows a second embodiment of the invention, including a composite laminate structure, again an aircraft stringer 51 as described in relation to FIG. 3. As for FIG. 4, only the top of the stringer has been shown in cross section. The dimensions of the stringer 51 are the same as the stringer 41 shown in FIG. 4, except for the fact that the end surface is flat and thus the height of the end surface is a constant 70 mm. The stringer 51 has an end surface 52 over which an inert PTFE strip 53 has been placed. The PTFE strip extends along the whole length of the stringer 51 and is therefore 1000 mm long. The PTFE strip is approximately cylindrical, with a diameter of 20 mm, though with an open hollow section including two approximately semi-cylindrical recesses 54, the semi-cylindrical recesses having a radius of 3 mm. The hollow section has an opening with a width of 10 mm so that the PTFE strip 53 fits over the end 52 of the composite laminate structure 51. An internal surface of the PTFE strip 53 rests upon the end surface 52 with one recess on each side of the stringer. The PTFE strip 53 is mechanically attached to the composite laminate structure 51 as follows: the recesses 54 are at least partially filled with an adhesive suitable for adhesively bonding to the stringer 51, the PTFE strip 53 is then placed over the end surface of the composite stringer 51 such that the recesses 54 are adjacent to the sides of the stringer 51, the adhesive in the recesses 54 comes into contact with the stringer 51 and cured such that is bonds to the sides of the stringer 51 and becomes rigid. The geometry of the recesses is such that the PTFE strip is now mechanically attached to the stringer 51. While the adhesive material may have adhesively bonded to the PTFE strip, the strength of the adhesive bonding with the stringer 51 is many times greater.

Due to the geometry of the recesses in the PTFE strip 53 and the formations created by the adhesive bonding to the stringer 51 it is possible to remove the PTFE strip from the stringer 51 and replace it with a similar one, should the PTFE strip 53 ever be damaged by an impact Whilst the present invention has been described and illustrated with reference to particular embodiments, it will be appreciated by those of ordinary skill in the art that the invention lends itself to many different variations not specifically illustrated herein. For example, in alternative embodiments of the first described embodiment there may be a different number of pre-preg patches used, dependent on the level of protection required for the end surface of the stringer.

For example, in the first described embodiment of the invention there could be 2, 6, 8 or 10 layers of pre-preg patches. The number of pre-preg patches does not need to be an even number. The orientation of the patches may not be balanced and symmetric. Depending on the required properties of the deflecting surface there may be more fibres aligned in one direction than another. The pre-preg patches may be woven rather than, or in combination with, uni-directional patches. A combination of dry materials and resin infusion could be used as a further alternative.

Furthermore, in the second described embodiment of the invention other noble plastics may be used to make the inert strip, such as perfluoroalkoxy fluorocarbon (PFA) or fluoroethleyene propylene (FEP).

The invention is also applicable to various aircraft component including stiffeners and spar structures.

Also, whilst the stringer of the above embodiments has a thickness of 10 mm, any of the embodiments can readily be adapted for use in relation to a wide range of thicknesses of composite laminate structures, including the range of 2 mm to 35 mm typical for aircraft structural components.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft component, comprising:
a composite laminate structure being a stringer, stiffener or spar; and
an impact protection device for protecting the composite laminate structure,
the composite laminate structure comprising a plurality of superimposed layers, each of the superimposed layers terminating at an edge whereby an end curved surface of the composite laminate structure is formed by the plurality of edges of the superimposed layers,
said impact protection device being arranged to protect said end curved surface of the composite laminate structure from direct impacts by foreign objects and comprising:
a deflecting surface having a uniform thickness, mounted over and covering, in direct surface contact, an entirety of the end curved surface of the composite laminate structure such that the deflecting surface is arranged to be directly open and exposed to and at least partially deflect end-on impacts on the end curved surface from moving foreign objects and thereby protecting the end curved surface of the composite laminate structure from direct impacts;

wherein an entire portion of the deflecting surface, which portion extends, in cross-section, across the thickness of the laminate structure and is inclined to a plane having a normal parallel to the direction in which the layers extend to the end surface, is exposed for receiving and at least partially deflecting direct impacts by foreign objects.

2. An aircraft component as claimed in claim 1, wherein the cross section of the deflecting surface conforms in shape to the cross-section of the end surface.

3. An aircraft component as claimed in claim 1, wherein the deflecting surface is defined by a composite laminate material.

4. An aircraft component as claimed in claim 3, wherein at least 90% of the cross-section of the deflecting surface is at an angle other than perpendicular to the direction in which the layers extend to the end surface.

5. An aircraft component as claimed in claim 1, wherein the deflecting surface is defined by an inert strip.

6. An aircraft component as claimed in claim 5, wherein the inert strip is mechanically attached to the composite laminate structure.

7. An aircraft component as claimed in claim 6, wherein the inert strip is mechanically attached to the composite laminate structure by formations present on the composite laminate structure for engaging with corresponding formations present on the inert strip.

8. An aircraft component as claimed in claim 7, wherein the formations present on the composite laminate structure are adhesively bonded to the composite laminate structure.

9. An aircraft component as claimed in claim 5, wherein the inert strip is removably mounted to the composite laminate structure which is an aircraft component.

10. An aircraft component as claimed in claim 9, wherein said strip is made of one selected from the group consisting of polytetrafluoroethylene (PTFE), perfluoroalkoxy fluorocarbon (PFA) and fluoroethleyene propylene (FEP).

11. An aircraft component as claimed in claim 5, wherein the cross section of the deflecting surface defined by the inert strip does not conform in shape to the cross-section of the end surface.

12. An aircraft component as claimed in claim 11, wherein the inert strip is removably mounted to the composite laminate structure, which is an aircraft component.

13. An aircraft component as claimed in claim 5, wherein said strip is deformable and has a hollow section in which an end having the end surface of the composite laminate structure is received, said strip being outwardly spaced from outermost layers among the superimposed layers of the composite laminate structure in said end to define, between said strip and said outermost layers of said end, two recesses.

14. An aircraft component as claimed in claim 13, further comprising:

adhesive at least partially filling the recesses and bonding the strip to the outermost layers of said end of said composite laminate structure.

15. An aircraft component as claimed in claim 1, wherein the deflecting surface has a smaller area that is exposed to direct impacts in a direction normal to the end surface than the area of the end surface the deflecting surface is protecting.

16. An aircraft including an aircraft component, the aircraft component comprising:

a composite laminate including a plurality of superimposed layers, each of the superimposed layers terminating at an edge whereby an end curved surface of the composite laminate structure is formed by the plurality of edges of the superimposed layers, wherein the composite laminate is a stringer, stiffener or spar; and a deflecting surface having a uniform thickness defined by a strip mounted over and covering, in direct surface contact, an entirety of the end curved surface to be directly open and exposed to and at least partially deflect end-on impacts on the end curved surface from moving foreign objects and thereby protecting the end curved surface of the composite laminate structure from direct impacts;

wherein an entire portion of the deflecting surface, which portion extends, in cross-section, across the thickness of the laminate structure and is inclined to a plane having a normal parallel to the direction in which the layers extend to the end curved surface, is exposed for receiving and at least partially deflecting direct impacts by foreign objects.

17. An aircraft wing including an aircraft component, the aircraft component comprising:

a composite laminate including a plurality of superimposed layers, each of the superimposed layers terminating at an edge whereby an end curved surface of the composite laminate structure is formed by the plurality of edges of the superimposed layers, wherein the composite laminate is a stringer, stiffener or spar; and a deflecting surface having a uniform thickness defined by a strip mounted over and covering, in direct surface contact, an entirety of the end curved surface to be directly open and exposed to and at least partially deflect end-on impacts on the end surface from moving foreign objects and thereby protecting the end curved surface of the composite laminate structure from direct impacts;

wherein an entire portion of the deflecting surface, which portion extends, in cross-section, across the thickness of the laminate structure and is inclined to a plane having a normal parallel to the direction in which the layers extend to the end surface, is exposed for receiving and at least partially deflecting direct impacts by foreign objects.

18. An aircraft component comprising a composite laminate structure, an inert strip, and material adhesively bonded to the composite laminate structure in a way that mechanically attaches the inert strip to an end curved surface of the composite laminate structure at which a multiplicity of layers of the laminate structure terminate, wherein the composite laminate structure is a stringer, stiffener or spar;

wherein said inert strip defines a deflecting surface having a uniform thickness, mounted over and covering, in direct surface contact, said end curved surface for being directly open and exposed to and at least partially deflecting end-on impacts on the end curved surface from moving foreign objects and thereby protecting the end curved surface of the composite laminate structure from direct impacts;

wherein said material is adhesively bonded to the composite laminate structure to create formations for removable physical engagement with corresponding formations present on the inert strip, such that the inert strip is mechanically removably attached to the composite laminate structure.

* * * * *